(12) United States Patent
Pinheiro et al.

(10) Patent No.: US 12,406,063 B2
(45) Date of Patent: Sep. 2, 2025

(54) BIOS ACTION REQUEST FOR AUTHORIZED APPLICATION

(71) Applicant: Hewlett-Packard Development Company, L.P., Spring, TX (US)

(72) Inventors: Endrigo Nadin Pinheiro, Spring, TX (US); Joshua Serratelli Schiffman, Bristol (GB); Richard Alden Bramley, Jr., Mansfield, MA (US); Valiuddin Ali, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 254 days.

(21) Appl. No.: 18/001,237

(22) PCT Filed: Jul. 30, 2020

(86) PCT No.: PCT/US2020/044307
§ 371 (c)(1),
(2) Date: Dec. 8, 2022

(87) PCT Pub. No.: WO2022/025901
PCT Pub. Date: Feb. 3, 2022

(65) Prior Publication Data
US 2023/0229774 A1    Jul. 20, 2023

(51) Int. Cl.
*G06F 21/57* (2013.01)
*G06F 21/64* (2013.01)

(52) U.S. Cl.
CPC .......... *G06F 21/572* (2013.01); *G06F 21/575* (2013.01); *G06F 21/64* (2013.01)

(58) Field of Classification Search
None
See application file for complete search history.

(56) References Cited

U.S. PATENT DOCUMENTS

| 6,748,544 | B1 * | 6/2004 | Challener | G06F 21/34 709/224 |
| 7,281,125 | B2 * | 10/2007 | Challener | G06F 21/575 380/259 |
| 7,308,102 | B2 * | 12/2007 | Anson | G06F 12/1433 711/E12.1 |
| 7,986,786 | B2 * | 7/2011 | Ibrahim | H04L 9/0825 713/193 |

(Continued)

FOREIGN PATENT DOCUMENTS

| CN | 104008342 B | 12/2017 |
| TW | 200611192 A | 4/2006 |
| WO | 2019/147360 A1 | 8/2019 |

*Primary Examiner* — Kambiz Zand
*Assistant Examiner* — Mahabub S Ahmed
(74) *Attorney, Agent, or Firm* — Quarles & Brady LLP

(57) ABSTRACT

Systems and methods are provided for a computing device with a basic input/output system (BIOS) comprising BIOS settings that are to be changed by BIOS actions. An application may request a BIOS action to change a BIOS setting. Using a received key from the BIOS, a processor of the computing device may implement a kernel driver to sign the request from the application in response to determining that the application is authorized to request the BIOS action. Further, the BIOS may perform the BIOS action without requiring an administrative password upon receiving the signed action request from the kernel driver.

17 Claims, 6 Drawing Sheets

(56) References Cited

U.S. PATENT DOCUMENTS

| | | | |
|---|---|---|---|
| 8,156,298 B1* | 4/2012 | Stubblefield | G06F 21/6281 |
| | | | 711/163 |
| 9,389,878 B1* | 7/2016 | Chan | G06F 21/572 |
| 9,686,404 B1* | 6/2017 | Pan | H04W 12/068 |
| 9,779,241 B2* | 10/2017 | Jacobs | G06F 21/572 |
| 10,528,740 B2 | 1/2020 | Callaghan et al. | |
| 10,977,367 B1* | 4/2021 | Adler | G06F 21/568 |
| 12,093,393 B2* | 9/2024 | Sayyed | G06F 8/65 |
| 2003/0018892 A1* | 1/2003 | Tello | G06F 21/85 |
| | | | 713/164 |
| 2003/0037244 A1* | 2/2003 | Goodman | G06F 21/572 |
| | | | 713/189 |
| 2003/0037246 A1* | 2/2003 | Goodman | G06F 21/572 |
| | | | 713/191 |
| 2003/0041254 A1* | 2/2003 | Challener | G06F 21/575 |
| | | | 713/193 |
| 2004/0039924 A1 | 2/2004 | Baldwin et al. | |
| 2005/0033970 A1* | 2/2005 | Anson | G06F 12/1433 |
| | | | 711/E12.1 |
| 2005/0044404 A1* | 2/2005 | Bhansali | H04W 12/082 |
| | | | 726/26 |
| 2005/0138399 A1* | 6/2005 | Cheston | G06F 21/31 |
| | | | 713/1 |
| 2006/0090085 A1* | 4/2006 | McKenney | G06F 21/86 |
| | | | 713/193 |
| 2006/0174109 A1* | 8/2006 | Flynn | G06F 8/66 |
| | | | 713/164 |
| 2007/0005951 A1* | 1/2007 | Davis | G06F 21/80 |
| | | | 713/2 |
| 2007/0180515 A1* | 8/2007 | Danilak | G06F 21/79 |
| | | | 726/16 |
| 2007/0271378 A1* | 11/2007 | Utsumi | G06F 21/80 |
| | | | 709/225 |
| 2008/0104409 A1* | 5/2008 | Matsuoka | G06F 21/575 |
| | | | 713/178 |
| 2008/0130893 A1* | 6/2008 | Ibrahim | G06F 21/572 |
| | | | 380/277 |
| 2009/0019528 A1* | 1/2009 | Wei | H04L 63/0876 |
| | | | 713/168 |
| 2009/0124374 A1* | 5/2009 | Patel | G07F 17/32 |
| | | | 463/29 |
| 2009/0158026 A1* | 6/2009 | Charles | G06F 21/575 |
| | | | 713/2 |
| 2009/0249120 A1* | 10/2009 | Yao | G06F 11/1417 |
| | | | 714/15 |
| 2009/0300348 A1* | 12/2009 | Aciicmez | H04L 63/08 |
| | | | 713/156 |
| 2010/0161998 A1* | 6/2010 | Chen | G06F 21/57 |
| | | | 713/189 |
| 2010/0287363 A1* | 11/2010 | Thorsen | G06F 9/441 |
| | | | 713/2 |
| 2011/0113181 A1* | 5/2011 | Piwonka | G06F 8/65 |
| | | | 711/E12.007 |
| 2012/0131317 A1* | 5/2012 | Hauck | G06F 21/575 |
| | | | 713/1 |
| 2012/0151223 A1* | 6/2012 | Conde Marques | G06F 21/6218 |
| | | | 713/193 |
| 2012/0191965 A1* | 7/2012 | Chu | G06F 11/1417 |
| | | | 713/100 |
| 2012/0260082 A1* | 10/2012 | Bobzin | G06F 21/572 |
| | | | 713/100 |
| 2013/0055382 A1* | 2/2013 | Bhattiprolu | G06F 21/572 |
| | | | 726/19 |
| 2013/0159690 A1* | 6/2013 | Tsukamoto | G06F 9/4401 |
| | | | 713/2 |
| 2013/0185789 A1* | 7/2013 | Hagiwara | G06F 21/554 |
| | | | 726/18 |
| 2014/0237262 A1* | 8/2014 | Jaber | G06F 21/575 |
| | | | 713/189 |
| 2015/0089238 A1* | 3/2015 | Lewis | H04L 9/3236 |
| | | | 713/183 |
| 2015/0143070 A1* | 5/2015 | Lee | G06F 12/1491 |
| | | | 711/173 |
| 2015/0143508 A1* | 5/2015 | Halibard | G06F 21/575 |
| | | | 726/19 |
| 2015/0186655 A1* | 7/2015 | Dasari | G06F 9/4405 |
| | | | 726/26 |
| 2015/0278556 A1* | 10/2015 | Avni | G06F 21/31 |
| | | | 726/35 |
| 2016/0028714 A1* | 1/2016 | Umberger | G06F 21/44 |
| | | | 726/18 |
| 2016/0182238 A1* | 6/2016 | Dewan | H04L 9/321 |
| | | | 713/193 |
| 2017/0075699 A1* | 3/2017 | Narayanan | H04L 9/14 |
| 2017/0168851 A1* | 6/2017 | Lin | G06F 9/4406 |
| 2017/0185782 A1* | 6/2017 | Furuya | G06F 21/32 |
| 2017/0255779 A1* | 9/2017 | Caklovic | G06F 21/57 |
| 2018/0004502 A1* | 1/2018 | Samuel | G06F 9/4401 |
| 2018/0004561 A1* | 1/2018 | Liguori | G06F 9/45558 |
| 2018/0025150 A1* | 1/2018 | Shivanna | G06F 21/6218 |
| | | | 713/2 |
| 2018/0101847 A1* | 4/2018 | Pisut, IV | G06Q 20/40145 |
| 2018/0157484 A1* | 6/2018 | Mi | G06F 8/65 |
| 2018/0239895 A1* | 8/2018 | Pearson | G06F 21/52 |
| 2018/0254898 A1* | 9/2018 | Sprague | H04L 9/0637 |
| 2018/0276000 A1 | 9/2018 | Roszak et al. | |
| 2018/0337776 A1* | 11/2018 | Miller | H04L 9/0822 |
| 2018/0343238 A1* | 11/2018 | Tola | H04L 67/1095 |
| 2018/0365427 A1* | 12/2018 | Callaghan | H04L 9/3247 |
| 2019/0042766 A1 | 2/2019 | Pappachan et al. | |
| 2019/0121981 A1* | 4/2019 | Fu | G06F 9/4401 |
| 2019/0236278 A1* | 8/2019 | Martinez | G06F 21/44 |
| 2019/0243634 A1* | 8/2019 | Lewis | G06F 8/654 |
| 2019/0303578 A1* | 10/2019 | Robison | G06F 21/572 |
| 2019/0312730 A1* | 10/2019 | Engan | H04L 63/126 |
| 2019/0340364 A1* | 11/2019 | Liu | H04L 9/0894 |
| 2019/0354726 A1* | 11/2019 | Critelli | G06F 11/1004 |
| 2019/0363894 A1* | 11/2019 | Kumar Ujjwal | H04L 9/3268 |
| 2020/0019708 A1* | 1/2020 | Puthillathe | H04L 63/10 |
| 2020/0143047 A1* | 5/2020 | Shivanna | H04L 9/3247 |
| 2020/0159931 A1* | 5/2020 | Schutt | H04L 9/0891 |
| 2020/0241747 A1* | 7/2020 | Gupta | G06F 21/62 |
| 2020/0293697 A1* | 9/2020 | Sion | H04L 63/10 |
| 2021/0034377 A1* | 2/2021 | Martin | G06F 9/44505 |
| 2021/0064734 A1* | 3/2021 | Chen | G06F 21/575 |
| 2021/0382979 A1* | 12/2021 | Bramley, Jr. | G06F 21/44 |
| 2022/0014389 A1* | 1/2022 | Nix | H04L 9/0838 |
| 2022/0374522 A1* | 11/2022 | Samuel | G06F 21/572 |
| 2022/0391545 A1* | 12/2022 | Stewart | G06F 3/0623 |
| 2022/0405392 A1* | 12/2022 | Nix | H04L 9/3249 |
| 2023/0006981 A1* | 1/2023 | Syrivelis | G06F 9/45558 |
| 2023/0129610 A1* | 4/2023 | Jacquin | G06F 21/606 |
| | | | 726/26 |

* cited by examiner

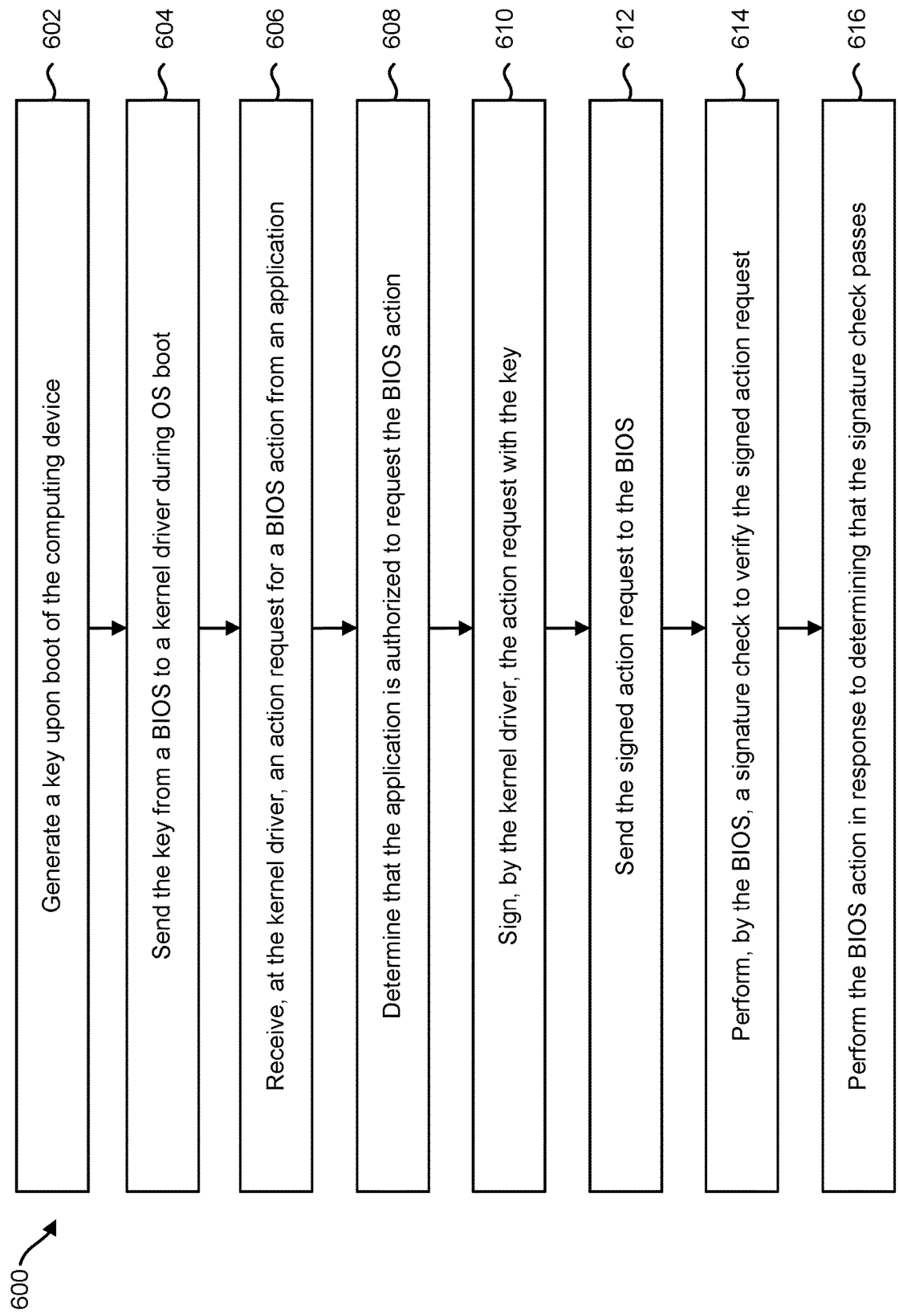

BIOS ACTION REQUEST FOR AUTHORIZED APPLICATION

BACKGROUND

Electronic technology has advanced to become virtually ubiquitous in society and has been used to improve many activities in society. For example, computing devices are used to perform a variety of tasks, including work activities, communication, research, and entertainment. Different varieties of electronic circuits may be utilized to provide different varieties of electronic technology.

BRIEF DESCRIPTION OF THE DRAWINGS

Various examples will be described below by referring to the following figures.

FIG. 6 is a flow diagram illustrating an example of a method for requesting a BIOS action by an authorized application.

Figure 1:
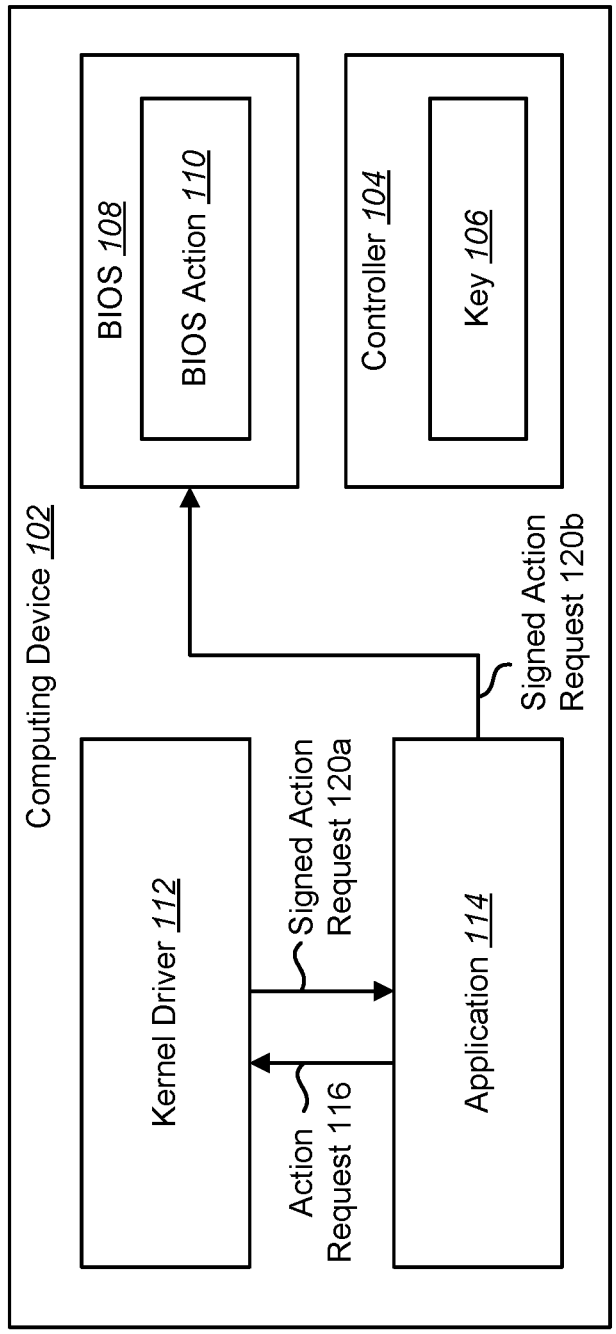
FIG. 1 is a block diagram illustrating an example of a computing device that may be utilized for a Basic Input/Output System (BIOS) action request by an authorized application.

Throughout the drawings, identical or similar reference numbers may designate similar, but not necessarily identical, elements. The figures are not necessarily to scale, and the size of some parts may be exaggerated to more clearly illustrate the example shown. Moreover, the drawings provide examples in accordance with the description; however, the description is not limited to the examples provided in the drawings.

DETAILED DESCRIPTION

A computing device may be a device that includes electronic circuitry. For instance, a computing device may include integrated circuitry (e.g., transistors, digital logic, semiconductor technology, etc.). Examples of computing devices include laptop computers, desktop computers, smartphones, tablet devices, wireless communication devices, game consoles, smart appliances, vehicles with electronic components, aircraft, drones, robots, smart appliances, etc.

In some examples of the computing devices described herein, a computing device may include a Basic Input/Output System (BIOS). As used herein, a basic input/output system (BIOS) refers to hardware or hardware and instructions to initialize, control, or operate a computing device prior to execution of an operating system (OS) of the computing device. Instructions included within a BIOS may be software, firmware, microcode, or other programming that defines or controls functionality or operation of a BIOS. In one example, a BIOS may be implemented using instructions, such as platform firmware of a computing device, executable by a processor. A BIOS may operate or execute prior to the execution of the OS of a computing device. A BIOS may initialize, control, or operate components such as hardware components of a computing device and may load or boot the OS of computing device.

In some examples, a BIOS may provide or establish an interface between hardware devices or platform firmware of the computing device and an OS of the computing device, via which the OS of the computing device may control or operate hardware devices or platform firmware of the computing device. In some examples, a BIOS may implement the Unified Extensible Firmware Interface (UEFI) specification or another specification or standard for initializing, controlling, or operating a computing device.

The BIOS may perform an action (referred to herein as a BIOS action) in response to a request sent from an application of the computing device. In some examples, a BIOS action may include changing settings (referred to as BIOS settings) that are accessible to applications of the computing device. These BIOS settings may include settings for the BIOS and/or settings for the BIOS interface (e.g., UEFI). Examples are described herein for secure access to the BIOS settings by an authorized application at runtime. In other examples, a BIOS action may include use of privileged BIOS capabilities, functions, resources, or other operations that the BIOS may perform in response to the application's request. Therefore, a BIOS action may include an operation that is to be performed by the BIOS in response to a request sent by an application.

In the examples described herein, the BIOS action may be performed with or without pre-knowledge of the BIOS administrative (Admin) password. Instead, the BIOS may cryptographically detect and verify a calling application.

In some examples, a kernel driver of the OS may be coupled to the BIOS through cryptography using keys generated at boot (e.g., start up) of the computing device. As used herein, a kernel driver may be a program that operates in kernel mode on the computing device.

In some examples, the kernel driver may be an early boot (e.g., boot-start) driver that is closely coupled to the BIOS through cryptography. The keys may be generated by a secure controller or by the BIOS itself. In some examples, the keys may be cryptographic keys or transport keys. In some examples, the keys may be symmetric or asymmetric. In the case of asymmetric keys, the public key may be provided to the BIOS and the kernel driver may hold the private key. The keys may be shared with the kernel driver during OS boot using a secure key exchange protocol using the BIOS as an intermediary.

After obtaining the cryptographic key from the BIOS, the kernel driver may expose interfaces for authorized applications wanting to send a request to the BIOS to perform a BIOS action (e.g., make changes to the BIOS settings, and/or use privileged BIOS capabilities, functions, resources, etc.). An application may first pass an action request to the kernel driver. In some examples, the action request may include setting information and a new value for the BIOS setting. In other examples, the kernel driver may then verify if the calling application is an authorized application using various techniques (e.g., digital signatures or other OS-level constructs). The kernel driver may then authorize the action request by signing the action request with the shared key provided by the BIOS.

While examples that include a kernel driver are described herein, in other examples, an early-launch mechanism may obtain the key from the BIOS and may sign the action request from the calling application. As used herein, an early-launch mechanism may include executable code (e.g., a driver, process, service, etc.) that launches at an early stage during an OS boot. The early-launch mechanism may also be referred to as early-launch code or early-boot code. In some examples, the early-launch mechanism may operate in kernel mode. An example of the early-launch mechanism includes an Early-Launch AntiMalware service. In some examples, an early-launch mechanism may perform the operations of the kernel driver described herein.

In some examples, the signed action request may be returned back to the calling application, which then sends the newly signed action request using BIOS access methods provided by an operating system (e.g., Windows Management Instrumentation (WMI) for WINDOWS for example). In this case, existing BIOS interfaces may be unmodified, thus keeping compatibility with the legacy tools. In some examples, the signed action request may be communicated to the BIOS using an authenticated communication method. For example, an authenticated communication may include symmetric methods (e.g., hash-based message authentication code (H MAC), Authenticated Encryption with Associated Data (AEAD) encryption, Advanced Encryption Standard (AES)-Galois/Counter Mode (GCM)) or asymmetric methods (e.g., signatures or integrated encryption schemes using Diffie Hellman (DH) and/or Elliptic-curve Diffie-Hellman (ECDH)).

Once received, the BIOS may detect the presence of the signature for the action request. The BIOS may then independently, or by using the controller that generated the key, verify the signature on the action request. If the signature check passes, the BIOS recognizes the calling application as an authorized application and performs the requested BIOS action.

This process of secure BIOS access may be performed by the BIOS even if a BIOS administrative password has been previously set and/or is not provided as part of the action request. In other examples, a policy decision may be made to use the BIOS administrative password for some or all operations. These examples also provide protection against man-in-the middle (MiTM) attacks on OS-BIOS access interfaces (e.g., WMI). In some examples, the payload passed to the kernel driver in the action request may also be encrypted, providing confidentiality in addition to integrity protection.

FIG. 1 is a block diagram illustrating an example of a computing device 102 that may be utilized for a BIOS action request 116 by an authorized application 114. Examples of the computing device 102 may include computing devices, laptop computers, desktop computers, smartphones, tablet devices, wireless communication devices, game consoles, vehicles with electronic components, aircraft, drones, robots, smart appliances, etc.

In some examples of access schemes (e.g., WMI) for the BIOS 108, there is no standardized way for the BIOS 108 to know the identity of a calling process. Therefore, in these examples, the BIOS 108 does not know if the calling application 114 is an authorized process or not. It should be noted that in some cases a BIOS action 110 (e.g., reading a BIOS setting) may be accessed without the calling process possessing administrative rights in the OS. In other cases a BIOS action 110 (e.g., reading a BIOS setting) may rely on administrative rights (e.g., by using a Private WMI interface and a namespace that is protected for access by administrative processes). However, in these cases, this does not mean that the calling process is an authorized one. For example, a malicious process with administrative access may also access the BIOS action 110. Therefore, ensuring that BIOS security policies and configurations are accessed by authorized processes is a challenge for computing devices.

A malicious actor (e.g., malware) that has access to BIOS settings may take over the computing device 102 with little effort. For example, a malicious actor can replace the serial number of a PC. In another example, a malicious actor can adjust the security settings to a more relaxed policy (e.g., by allowing previously prevented devices such as cameras, WiFi cards, Microphone, USB ports, etc.). The malicious actor can then use these exploits to mount new attacks. The malicious actor could also change settings that could prevent the operating system from starting securely (e.g., turning off Secure Boot), may disable boot time power on password, may disable virtualization or Trusted Platform Module (TPM), and so on.

As seen by this discussion, some computing device architectures do not offer a method for the BIOS 108 to determine whether a trusted process is trying to access the BIOS configuration or whether a malicious actor gained undue privileges and is calling to alter security configuration of the BIOS 108. The examples described herein provide mechanisms by which the BIOS 108 may grant access to a BIOS action 110 to authorized processes while blocking access to other (unauthorized) processes.

In some examples, the computing device 102 may include a controller 104. In some examples, the controller 104 may be a microcontroller (e.g., embedded controller) that performs tasks on the computing device 102. In some examples, the controller 104 may perform tasks that the OS does not perform. In some examples, the controller 104 may include memory (e.g., RAM, ROM) that is independent of memory used by the main OS of the computing device 102.

The controller 104 may generate a key 106 upon boot of the computing device 102. At boot time (e.g., upon start up or power up of the computing device 102), and on every boot, the controller 104 may generate a cryptographic transport key 106. In some examples, the key 106 may be a symmetric key or may include an asymmetric key pair (e.g., a private and public key pair). The controller 104 may securely store the key 106. For example, the controller 104 may store the key in a storage (e.g., memory) that is exclusively accessible to the controller 104. In other examples, the controller 104 may also encrypt the key 106 (or key pair) with another key embedded inside the controller 104 that is exclusively accessible to the controller 104.

In some examples, the controller 104 may send the key 106 to the BIOS 108 upon execution of the BIOS 108. For example, the controller 104 may pass the key 106 to the BIOS when BIOS starts executing. In some examples, the controller 104 may pass the key 106 through a private channel or protocol. If the BIOS 108 does extract the key 106 from the controller 104 and stores the key 106, the BIOS 108 may extract the key 106 as early as possible during a BIOS power-on self-test (POST). The BIOS 108 may ensure that the key 106 is protected in the most secure memory available to the BIOS 108 (e.g., System Management Mode (SMM) memory).

In the example of FIG. 1, the controller 104 may store the key 106 and may verify a signed action request 120b signed with the key 106 as described below. It should be noted that in other examples, the BIOS 108 may generate the key 106. An example of this approach is described in FIG. 3.

The BIOS 108 may create or accommodate for an interface that can allow a kernel driver 112 to request the key 106. In some examples, the kernel driver 112 may be an OS-based early boot driver. In some examples, the interface may include an Advanced Configuration and Power Interface (ACPI) method call, a WMI call, or other method that allows an OS-BIOS interface.

During early stages of the OS boot process (e.g., before most third-party code is loaded), the kernel driver 112 may be started. The kernel driver 112 may also be referred to as a kernel boot-start driver, a boot driver or an early-boot driver. There are various examples for how the kernel driver 112 may be installed or injected in the OS. These examples include a regular mode of code installation, using a Windows Platform Binary Table (WPBT), injecting the kernel driver 112 in a guest OS using a Hypervisor, etc. It should be noted that a high level of security may be achieved by the kernel driver 112 being an early boot driver to ensure that the kernel driver 112 is one of the very first set of trusted processes an operating system loads. For example, the key 106 may be extracted from the BIOS 108 as early as possible in a manner that prevents untrusted or un-authorized applications from acquiring the key 106 before the kernel driver 112. This key exchange may be implemented based on desired security guarantees and cryptographic key procedures (e.g., key agreement, key wrapping, and direct transfer of key material).

In some examples, with a BIOS 108 and OS that use UEFI Secure Boot, the BIOS 108 may ensure that the OS the BIOS 108 is booting is cryptographically secure. The BIOS 108 may also ensure that the OS loader and the other early parts of the OS ensure that the integrity of the components (e.g., the kernel driver 112) the BIOS 108 is loading is secure. Other OS-specific advance security technologies like Hypervisor Code Integrity (HVCI) may provide additional assurances where the integrity and the functionality of the kernel driver 112 is ensured even more by use of a hardware assisted Hypervisor. This ensures that the kernel driver 112 will be one of the earliest code modules that run and has a high probability of obtaining the key 106 before other processes.

The kernel driver 112 may receive the key 106 from the BIOS 108 during OS boot. When loaded, the kernel driver 112 may make a call directly to the BIOS 108 to request the cryptographic key 106 (e.g., transport key) generated by the controller 104. In some examples, the BIOS 108 may request the key 106 from the controller 104 in response to receiving the request for the key 106 from the kernel driver 112. The BIOS 108 may pass the key 106 to the kernel driver 112 in response to receiving the key 106 from the controller 104.

In some examples, the BIOS 108 may share the generated key 106 with the kernel driver 112 during OS boot using a secure key exchange protocol. For example, the kernel driver 112 may make an ACPI method call to the BIOS 108 to request the key 106. It should be noted that the ACPI method call may provide additional security against attackers as applications and/or unprivileged code (e.g., ring 3 code) would not be able to obtain the key 106. Furthermore, with the kernel driver 112 being an early-boot driver, the chances of malware implemented as a kernel driver to obtain the key 106 are significantly reduced.

The ACPI method call may allow the kernel driver 112 to extract the key 106 from a BIOS-provided memory location. In some examples, the extraction of the key 106 may be a "Get" type operation. In other examples, the extraction of the key 106 may employ a complex key exchange protocol. In another example, the BIOS 108 may ask the controller 104 to provide the BIOS 108 the key 106 when asked. The BIOS 108 may then pass the key 106 over to the kernel driver 112.

In some examples, the kernel driver 112 that calls the BIOS 108 may also ensure that the key 106 is erased from the temporary memory slot where the BIOS 108 placed the key 106, preventing another driver that loads after the kernel driver 112 from also accessing the key 106. Therefore, the BIOS 108 may erase memory storing the key 106 to prevent additional reads to the key 106 in response to sending the key 106 to the kernel driver 112. In some examples, the BIOS 108 may ensure that after kernel driver 112 extracts the key 106, the BIOS 108 no longer honors a call (e.g., ACPI method call) for key extraction, thus preventing other rogue entities from extracting the key 106.

The kernel driver 112 may receive an action request 116 from an application 114 for a BIOS action 110. For example, the kernel driver 112 may expose an interface for OS processes to call in and pass data (e.g., Binary Large OBject (BLOB)) to the kernel driver 112. In some examples, a legitimate (e.g., authorized) application 114 that seeks access to a protected BIOS action 110 may call the kernel driver 112 using the driver-exposed interface. The application 114 may pass instructions (or a set of instructions) that is to be performed by the BIOS 108 in an action request 116.

The kernel driver 112 may perform authorization of the action request 116 so that the BIOS 108 can trust the action request 116 and perform the BIOS action 110. In some examples, the kernel driver 112 may first verify that the calling application 114 is an authorized application in response to receiving the action request 116. In an example, the kernel driver 112 may use a whitelist that includes applications authorized to request the BIOS action 110. In another example, the kernel driver 112 may verify the on-disk identity of the calling application 114 by verifying the digital signature of the application 114 and ensuring the calling application 114 is a known and/or authorized process. In yet another example, the kernel driver 112 may ensure that the location of the calling application 114 is controlled via a strong access-control list (ACL), thereby preventing other applications from placing rogue code (e.g., a rogue Dynamic-link library (DLL)) next to a legitimate application 114, thus causing unintended code injection. In other examples, the OS may be configured with other pieces of technology (e.g., anti-malware, anti-virus, next-gen anti-virus, endpoint detection and response (EDR) tools, or other tools that can prevent process hallowing to ensure that the caller application 114 has not been overtaken by an imposter.

The kernel driver 112 may sign the action request 116 with the key 106 in response to determining that the application 114 is authorized to request the BIOS action 110 to generate a signed action request 120a. For example, if the calling application 114 is verified to be legitimate and/or authorized by the kernel driver 112 to request changes to the BIOS 108, the kernel driver 112 may sign the incoming action request 116 with the key 106 that the kernel driver 112 acquired during boot. In some examples, the action request 116 may be signed by the kernel driver 112 with the key 106 using a digital signature, hash-based message authentication code (HMAC), or an authenticated encryption (e.g., AES-GCM) scheme. In some examples, the kernel driver 112 may also add additional metadata to the signed action request 120a that adds protections (e.g., integrity, confidentiality, and/or replay-protection) using the key 106.

In the example of FIG. 1, the kernel driver 112 may return the signed action request 120a to the application 114. In this case, the application 114 sends the signed action request 120b to the BIOS 108. For example, once the calling application 114 receives the signed action request 120a from the kernel driver 112, the application 114 can then use the available methods (e.g., WMI methods) for passing the signed action request 120b to the BIOS 108.

In other examples, the kernel driver 112 may send the signed action request 120a to the BIOS 108 to perform the BIOS action 110. In this case, instead of sending the signed action request 120a back to the application 114, the kernel driver 112 may send the signed action request 120a directly to the BIOS 108. This may be accomplished as described in FIG. 2.

Upon receiving the signed action request 120b, the BIOS 108 may detect the signed action request 120a is signed. If the BIOS 108 detects the signed action request 120b, then the BIOS 108 may perform a signature check to verify the signed action request 120b. In some examples, the BIOS 108 may authenticate the action request 116 using the key 106. In some examples where the key 106 was generated and stored by the controller 104, the BIOS 108 may delegate the task of validating the integrity of the signed action request 120b (and/or removing the confidentiality envelope) to the controller 104 using a transport protocol available on the computing device 102.

If the signature check passes (e.g., is successful), then the BIOS 108 may process the signed action request 120b. For example, the BIOS 108 may change a BIOS setting or perform an operation according to the signed action request 120a in response to determining that the signature check passes. In some examples, the BIOS 108 may return the result (e.g., success or failure) of the signed action request 120b to the calling application 114.

If the BIOS 108 finds that an incoming action request was not properly protected or authenticated with the key 106 (e.g., if the signature check fails, an action request does not include the key 106), then the BIOS 108 may refuse to act on the action request. In some examples, the BIOS 108 may treat this as an un-authorized attempt to change a BIOS setting by a rogue application. In some examples where a BIOS administrative access password is set, the BIOS 108 may treat this failed signature check as a password failure situation where multiple failures lock out further requests, even if the password provided in the action request was correct.

These examples provide controlled access to a BIOS action 110, preventing malicious or un-authorized processes to change or to access BIOS configurations. The access to the BIOS action 110 may be prevented even if the malicious or un-authorized processes somehow obtained access to the BIOS administrative password (if one is set).

It should be noted that while the above examples were described using a BIOS action 110, these examples also apply to other situations where the BIOS 108 is to trust any incoming data or commands. Similarly, while Windows and x86 terminology was used, these examples also apply to other OS and computer architectures.

It should also be noted that these examples may add several levels of protection and flexibility for performing a BIOS action 110. For example, the BIOS 108 may use the signed action request 120a described herein to provide access to sensitive BIOS settings while allowing and honoring other action requests to come in un-signed. In other examples, the BIOS 108 may allow Get requests to be honored without signing but may expect some or all Set requests to be authorized. Again, these examples may be extended to allow for a flexible security model for accessing a BIOS action 110.

The described examples provide authenticity, integrity, and confidentiality for calls to the BIOS 108 (e.g., WMI calls). Enforcement of access control policies for the calls (e.g., WMI calls) may be enforced in the kernel driver 112. Once the BIOS 108 knows that the calling application 114 is authorized, the BIOS 108 may then perform the BIOS action 110 immediately without depending on authorization from a physically present user, thus simplifying user experiences while increasing security. The described examples may also eliminate potential MiTM attacks between the BIOS 108 and calling applications for data returned from BIOS.

Using a kernel driver 112 that is an early boot-start driver to retrieve the key 106 from the BIOS 108 may reduce the attack surface to a millisecond-scale timeframe. This is because the kernel driver 112 is one of the first processes that starts during the OS boot process. After the first request to get the key 106, the BIOS 108 may erase the key 106 from the temporary memory of the BIOS 108, which prevents any other requests from retrieving the key 106, ensuring that the kernel driver 112, and not other processes, will receive the key 106.

Furthermore, because of the kernel driver 112 may run in a privileged state (e.g., privilege level 0, or ring 0), no other user mode process can read or replace the memory structures of the kernel driver 112. Therefore, the key 106 is protected against attacks from user mode processes. In some examples, the kernel driver 112 may rely on the OS to prevent non-signed drivers to be installed in the kernel mode. This means that the kernel driver 112 may be protected from being replaced or corrupted by another kernel driver.

In some examples, the computing device 102 may include additional components and/or some of the components described herein may be removed and/or modified without departing from the scope of this disclosure. In some examples, the computing device 102 and/or the controller 104 may include a processor and/or a memory. The processor may be any of a central processing unit (CPU), a semiconductor-based microprocessor, graphics processing unit (GPU), field-programmable gate array (FPGA), an application-specific integrated circuit (ASIC), and/or other hardware device suitable for retrieval and execution of instructions stored in the memory. The processor may fetch, decode, and/or execute instructions stored in the memory. The memory may be any electronic, magnetic, optical, or other physical storage device that contains or stores electronic information (e.g., instructions and/or data). Thus, the memory may be, for example, Random Access Memory (RAM), Electrically Erasable Programmable Read-Only Memory (EEPROM), Dynamic Random Access Memory (DRAM), magnetoresistive random-access memory (M RAM), phase change RAM (PCRAM), memristor, flash memory, a storage device, and/or an optical disc, etc. In some examples, the memory may be a non-transitory tangible computer-readable storage medium, where the term "non-transitory" does not encompass transitory propagating signals. The processor may be in electronic communication with the memory. In some examples, a processor and/or memory of the controller 104 may be separate from an applications processor (e.g., CPU) of the computing device 102.

In some examples, the computing device 102 may include an input/output interface (not shown) through which the computing device 102 may communicate with an external device or devices (not shown). The input/output interface may include hardware and/or computer-readable instructions to enable the processor to communicate with the external device or devices. The input/output interface may enable a wired or wireless connection to the external device or devices. In some examples, the input/output interface may further include a network interface card and/or may also include hardware and/or computer-readable instructions to enable the processor to communicate with various input and/or output devices, such as a keyboard, a mouse, a display, another apparatus, computing device, electronic device, etc., through which a user may input instructions and/or indications into the computing device 102.

Figure 2:
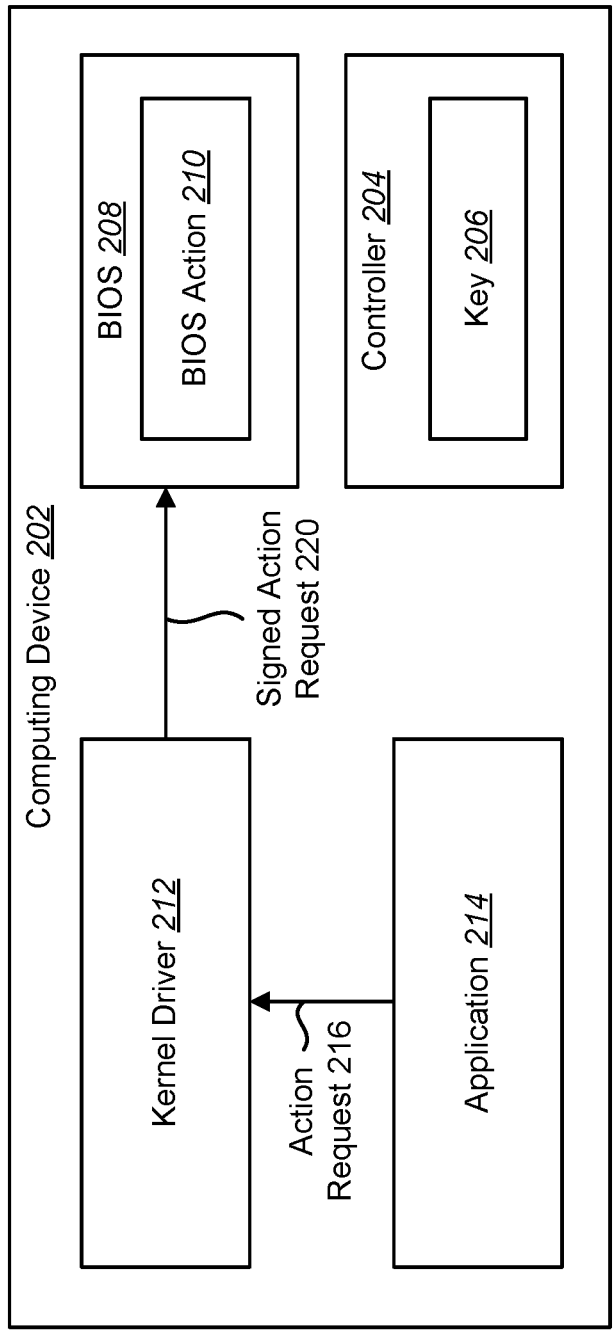
FIG. 2 is a block diagram illustrating another example of a computing device that may be utilized for a BIOS action request by an authorized application.

FIG. 2 is a block diagram illustrating another example of a computing device 202 that may be utilized for a BIOS action request 216 by an authorized application 214. The computing device 202 may be implemented in accordance with the computing device 102 described in FIG. 1. For example, the controller 204 may generate a key 206. This key 206 may be provided to the kernel driver 212 via the BIOS 208 as described in FIG. 1.

The kernel driver 212 may receive an action request 216 from an application 214 for a BIOS action 210. The kernel driver 212 may perform authorization of the action request 216 so that the BIOS 208 can trust the action request 216 and perform the BIOS action 210. The kernel driver 212 may sign the action request 216 with the key 206 in response to determining that the application 214 is authorized to request the BIOS action 210. This may be accomplished as described in FIG. 1.

In the example of FIG. 2, the kernel driver 212 may send the signed action request 220 to the BIOS 208 to perform the BIOS action 210. In this case, instead of sending the signed action request 220 back to the application 214, the kernel driver 212 may send the signed action request 220 directly to the BIOS 208.

Upon receiving the signed action request 220, the BIOS 208 may verify the signed action request 220 based in the key 206. This may be accomplished as described in FIG. 1. If the signed action request 220 is verified, the BIOS 208 may perform the BIOS action 210.

Figure 3:
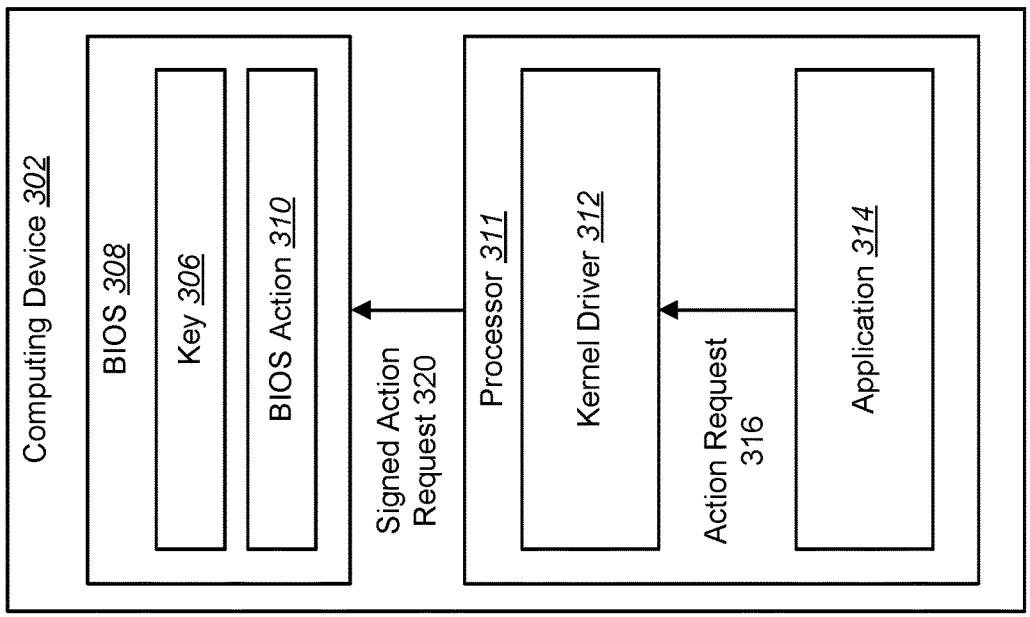
FIG. 3 is a block diagram illustrating yet another example of a computing device that may be utilized for a BIOS action request by an authorized application.

FIG. 3 is a block diagram illustrating yet another example of a computing device 302 that may be utilized for a BIOS action request 316 by an authorized application 314. The computing device 302 may be implemented in accordance with the computing device 102 described in FIG. 1.

In this example, the BIOS 308 may generate the key 306 used to sign an action request 316 sent by an application 314. For example, upon boot of the computing device 302, the BIOS 308 may generate the key 306. The BIOS 308 may store the key 306 in a secure internal structure (e.g., a UEFI variable, SMM or private storage on shared or private flash memory).

The BIOS 308 may create an interface to allow the kernel driver 312 to request the key during OS boot. This may be accomplished as described in FIG. 1. However, in this example, the BIOS 308 may retain the key 306 in storage for use in verifying a signed action request 320.

In this example, a processor 311 of the computing device 302 may implement the kernel driver 312 and the calling application 314. For example, the kernel driver 312 and the calling application 314 may be implemented as code executed by the processor 311. In some examples, the processor 311 may be any of a CPU, a semiconductor-based microprocessor, GPU, FPGA, an ASIC, and/or other hardware device suitable for retrieval and execution of instructions stored in memory. The kernel driver 312 may use the key 306 to sign an action request 316 in response to determining that the application 314 is authorized to request the BIOS action 310. This may be accomplished as described in FIG. 1.

The processor 311 may send the signed action request 320 to the BIOS 308. In an example, the application 314 may send the signed action request 320 to the BIOS 308, as described in FIG. 1. In another example, the kernel driver 312 may send the signed action request 320 to the BIOS 308, as described in FIG. 2.

Upon receiving the signed action request 320, the BIOS 308 may perform a signature check to verify the signed action request 320. In this case, the BIOS 308 may validate the integrity of the signed action request 320 (and/or remove the confidentiality envelope) using the stored key 306. The BIOS 308 may perform the BIOS action 310 in response to determining that the signature check passes.

Figure 4:
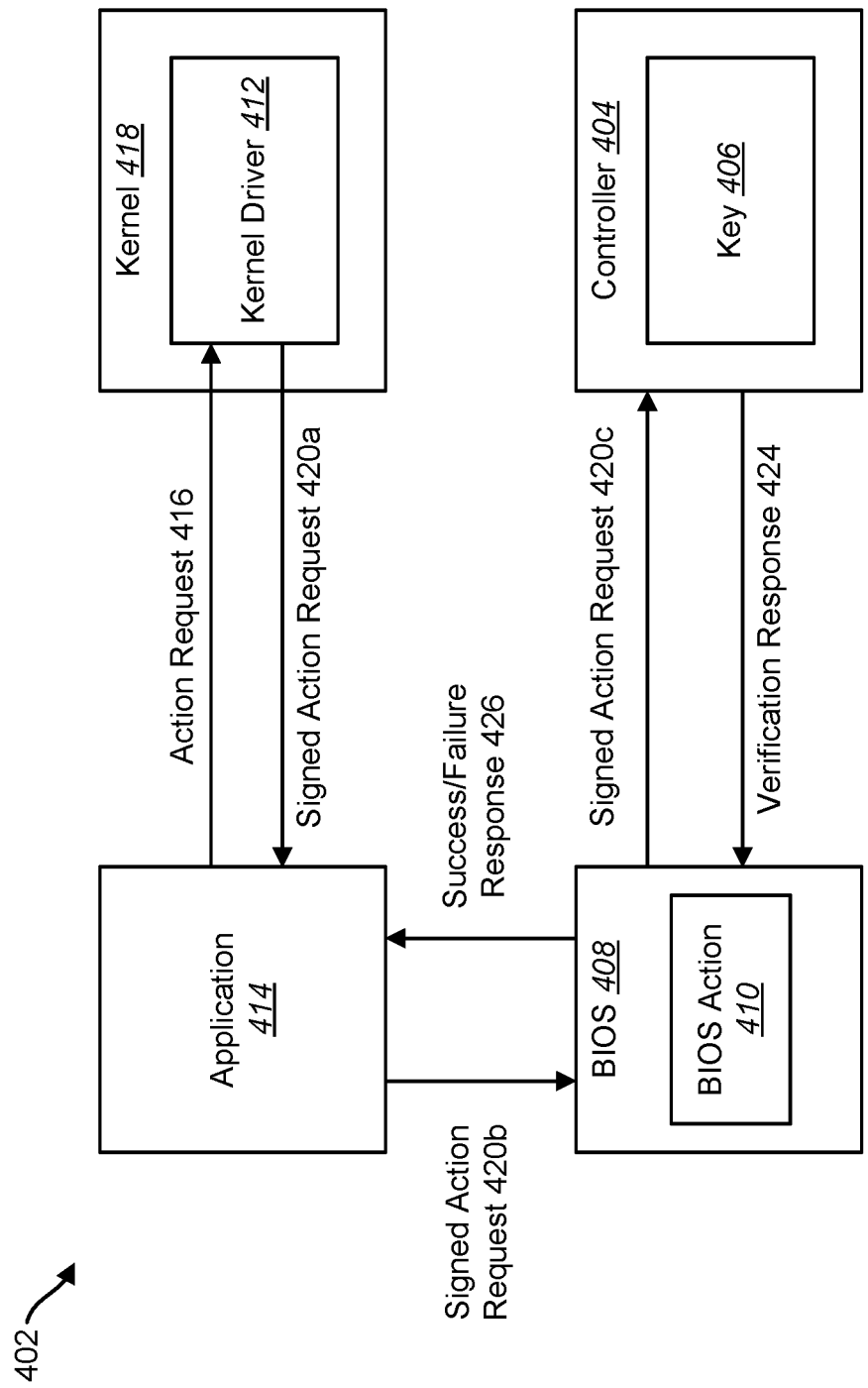
FIG. 4 is a block diagram illustrating yet another example of a computing device that may be utilized for a BIOS action request by an authorized application.

FIG. 4 is a block diagram illustrating yet another example of a computing device 402 that may be utilized for a BIOS action request by an authorized application. At the booting of the computing device 402, the controller 404 may generate a key 406. In some examples, the key 406 may be a transport key. In some examples, the controller 404 may generate an asymmetric (e.g., public-private) key pair using RSA, ECC, or other asymmetric cryptographic procedure. In other examples, the controller 404 may generate a symmetric key from a random number generator (RNG) of suitable security.

The controller 404 may securely store the key 406 (or key pair) into a secure storage accessible exclusively by the controller 404. In some examples, this secure storage may be a private spy chip accessible exclusively by the controller 404 by hardware design. In another example, the secure storage may be integrated flash storage inside the controller 404. In some examples, if the key 406 is unique and accessible exclusively by the controller 404, the controller 404 may use that key 406 to further protect the confidentiality of a stored key pair to prevent un-authorized snooping of the secrets through offline attacks.

The controller 404 may send the key 406 to the BIOS 408. In the case of an asymmetric key pair, the controller 404 may send the public part of the key (e.g., the public key) to the BIOS 408. For a symmetric key, the controller 404 may send the entire key 406 to the BIOS 408.

The BIOS 408 may store the key 406. For example, the BIOS 408 may store the key 406 in an internal structure such as a UEFI variable, SMM or private storage on a shared (or private) flash. The BIOS 408 may hand control to the operating system, which then starts to boot.

During the operating system boot stages, the very basic (e.g., core) OS components start to load and boot. Next, early-launch drivers may load followed by early boot drivers (also referred to as boot-start drivers or boot drivers) may start to load. The kernel driver 412 may be started as part of the kernel 418 of the OS. It should be noted that a specific boot time is not integral to this example, but the kernel driver 412 may be started before any "untrusted" code can run.

In some examples, the kernel driver 412 may be an Early Launch of Anti Malware (ELAM)-type driver, a boot driver, or a boot driver that is launched and/or loaded by ELAM. These types of drivers may be trusted code that launch before any untrusted code runs.

The kernel driver 412 may request the key 406 from the BIOS 408. In response to this request, the BIOS 408 may return the key 406 to the kernel driver 412. The BIOS 408 may then erase the memory structure storing the key 406 for the BIOS 408 to prevent additional reads to the key 406. This may prevent other malicious programs from accessing the key 406 from the BIOS 408, which would allow the malicious programs to then become a malicious middleware driver. By ensuring that the kernel driver 412 is an early-boot driver, a large set of malicious malware is eliminated because the OS ensures that boot drivers are signed by legitimate organizations. For example, ELAM uses an Extended Validation (EV) certificate and provides a high bar for organizations to meet before an EV certificate is issued. It should be noted that the controller 404 in this example may retain the key 406 in secure storage.

The kernel driver 412 may store the key 406 internally in memory. In some examples, an operating system may ensure that accessing internal memory belonging to early-boot drivers is restricted. However, the kernel driver 412 may also use additional techniques to enhance protection of memory holding the key. For example, the kernel driver 412 may use enclave technologies provided by hardware and/or chipset schemes or via a hypervisor, etc. After the kernel driver 412 completes initialization, the rest of the operating system may continue to boot normally.

At a later stage, an authorized application 414 may start. The application 414 may be a process executed by the OS. In some examples, the application 414 may request a specific BIOS action 410. The kernel driver 412 may verify that the application is authorized to request the BIOS action 410.

In some examples, the application 414 may include code signed by a key pair that is trustworthy to the BIOS 408. For example, the public key belonging to the signing key may be embedded in the BIOS secure memory. The name of the application 414 and/or the signer company name may also be ingrained in the BIOS secure memory.

In some examples, a whitelist may be defined for the kernel driver 412 to use to authenticate applications 414. The whitelist may include authorized processes and/or code signing certificate authorities (CAs) and corresponding WMIs that are allowed to be called by the application 414. The whitelist may be hardcoded in the kernel driver 412 or provided as a boot-time argument. In some examples, the granularity of the whitelist may be at the WMI level or even parameter level.

The application 414 may open a handle to the kernel driver 412 in preparation for sending an action request 416. The kernel driver 412 may determine the full path to the file of the application 414 attempting to get the handle from the kernel driver 412. The kernel driver 412 may verify the signature on the file. If the signature fails to verify for any reason (e.g., no certificate, no signature, bad signature, etc.), then the kernel driver 412 may fail the request for a handle.

In some examples, the kernel driver 412 may check the publisher information against a predefined list of valid publishers. If the publisher is not on the predefined list, then the kernel driver 412 may fail the request for a handle.

In some examples, the kernel driver 412 may verify that the original filename specified in the resources of the handle request matches the filename of the application 414. This may prevent swapping of other binaries from the same publisher. If the filenames are different, then the kernel driver 412 may fail the request for a handle.

If the kernel driver 412 verifies that the application 414 is authorized to request the BIOS action 410, then the application 414 may proceed to build the action request 416 to be sent to the BIOS 408 as a data buffer (e.g., a BLOB used in WMI). The application 414 may then send the action request 416 to the kernel driver 412 asking the kernel driver 412 to sign the action request 416. For example, the kernel driver 412 may expose an interface allowing the application 414 (and other drivers) to call.

The kernel driver 412 may then protect the action request with the key 406 to generate a signed action request 420a. In some examples, the kernel driver 412 may add anti-replay or targeting information to the signed action request 420a. Protection of the signed action request 420a may include authentication, encryption, and integrity protection. For symmetric keys, the signed action request 420a may be encoded using HMAC or encrypted (using AES-GCM, for instance). For asymmetric keys, the signed action request 420a may be protected using a symmetric session key. Depending on the procedure, the session secret may be derived through a key agreement or a key encapsulation method between the kernel driver 412 and the BIOS 408 or controller 404.

The kernel driver 412 may return the signed action request 420a back to the application 414. With the protected data returned from the kernel driver 412, the application 414 may call the BIOS 408 (e.g., using a WMI) and may send the signed action request 420b to the BIOS 408.

Upon receiving the signed action request 420b, the BIOS 408 may send the signed action request 420c to the controller 404 to verify the signed action request 420c using the key 406. The controller 404 may also process any anti-replay or targeting mechanisms that were included in the signed action request 420c. The targeting mechanisms may allow for unique identification of the computing device 402. The anti-replay mechanisms may restrict the scope of command execution on the computing device 402, such as a time duration during which the command can be executed, the number of times a command can execute on the given computing device 402, etc.

The controller 404 may decrypt the data in the signed action request 420c (if needed). The controller 404 may verify the data integrity and authenticity of the signed action request 420c using the key 406. The controller 404 may return the resulting data back to the BIOS 408 in a verification response 424. If the data verification fails, then the controller 404 may return an error in the verification response 424.

If the controller 404 returns a successfully verified action request, then the BIOS 408 may analyze the signed action request 420c to determine what action to perform. The BIOS 408 may then perform the BIOS action 410 based on the signed action request 420c.

In some examples, the BIOS 408 may return a response 426 to the calling application 414. For example, if the signed action request 420b passes the signature check, then the BIOS 408 may return the response 426 as a success response. Otherwise, the BIOS 408 may return the response 426 as a failure response.

Figure 5:
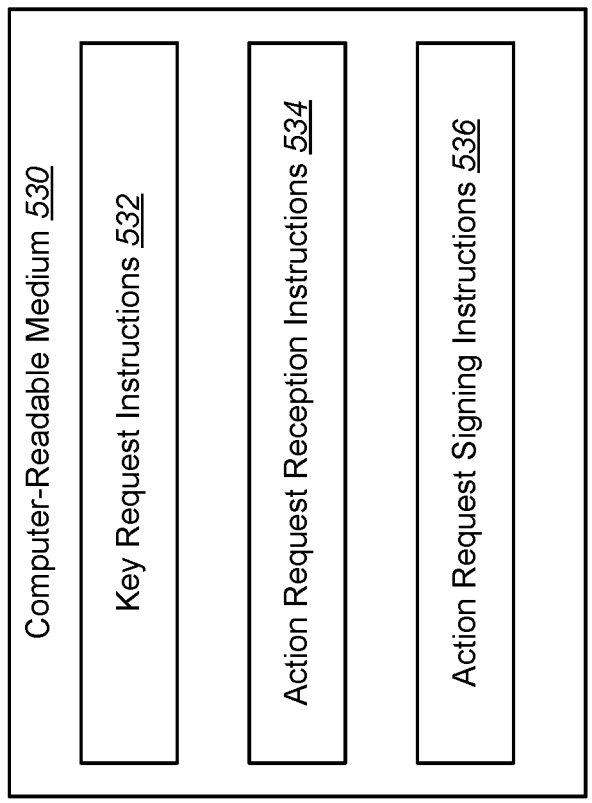
FIG. 5 is a block diagram illustrating an example of a computer-readable medium for a BIOS action request by an authorized application.

FIG. 5 is a block diagram illustrating an example of a computer-readable medium 530 for a BIOS action request by an authorized application. The computer-readable medium 530 may be a non-transitory, tangible computer-readable medium 530. The computer-readable medium 530 may be, for example, RAM, EEPROM, a storage device, an optical disc, and the like. In some examples, the computer-readable medium 530 may be volatile and/or non-volatile memory, such as DRAM, EEPROM, MRAM, PCRAM, memristor, flash memory, and the like. In some examples, the computer-readable medium 530 described in FIG. 5 may be an example of memory for a computing device 102 described in FIG. 1. In some examples, code (e.g., data and/or executable code or instructions) of the computer-readable medium 530 may be transferred and/or loaded to memory or memories of the computing device 102.

The computer-readable medium 530 may include code (e.g., data and/or executable code or instructions). For example, the computer-readable medium 530 may include key request instructions 532, action request reception instructions 534, and/or action request signing instructions 536.

In some examples, the key request instructions 532 may be instructions that when executed cause a processor of the computing device to send a request from a kernel driver during OS boot to a BIOS for a key. The key may be generated by a controller or the BIOS upon boot of the computing device. In some examples, this may be accomplished as described in FIGS. 1-4.

In some examples, the action request reception instructions 534 may be instructions that when executed cause the processor of the computing device to receive an action request for a BIOS action from an application. For example, the processor may expose an interface for receiving the action request for the BIOS action from the application. In some examples, this may be accomplished as described in FIGS. 1-4.

In some examples, the action request signing instructions 536 may be instructions that when executed cause the processor of the computing device to sign the action request with the key in response to determining that the application is authorized to request the BIOS action. For example, the processor may verify that the application is an authorized application in response to receiving the action request. The processor may authorize the action request by signing the action request with the key. The signed action request may allow the BIOS to perform the BIOS action. In some examples, this may be accomplished as described in FIGS. 1-4.

FIG. 6 is a flow diagram illustrating an example of a method 600 for requesting a BIOS action by an authorized application. The method 600 and/or an element or elements of the method 600 may be performed by a computing device. For example, an element or elements of the method 600 may be performed by the computing device 102 described in FIG. 1, the controller 104 described in FIG. 1, the computing device 202 described in FIG. 2, the computing device 302 described in FIG. 3, the computing device 402 and/or the controller 404 described in FIG. 4, any of which may be referred to generally as a "computing device" in FIG. 6. In some examples, the method 600 may be performed using an instruction or instructions described in FIG. 5.

A computing device may generate 602 a key upon boot of the computing device. In some examples, a controller or the BIOS may generate 602 the key when the computing device powers on as described in FIGS. 1-4.

The computing device may send 604 the key from the BIOS to a kernel driver during OS boot. For example, the BIOS may create an interface to allow the kernel driver to request the key. The BIOS may receive a request for the key from the kernel driver. The BIOS may then pass the key to the kernel driver. The BIOS may share the generated key with the kernel driver during OS boot using a secure key exchange protocol. In some examples, the BIOS may erase memory storing the key to prevent additional reads to the key in response to sending the key to the kernel driver.

The computing device (e.g., the kernel driver) may receive 606 an action request from an application for a BIOS action. For example, the kernel driver may expose an interface for receiving the action request. The application may send the action request using the interface provided by the kernel driver.

The computing device (e.g., the kernel driver) may determine 608 that the application is authorized to request to the BIOS action. For example, the kernel driver may use a whitelist of authorized applications to authenticate the calling application. In other examples, the kernel driver may verify a signature of the calling application. In yet other examples, the kernel driver may verify that the original filename specified in the resources of the handle request matches the filename of the application.

The computing device (e.g., the kernel driver) may sign 610 the action request with the key. For example, the kernel driver may protect the action request with the key to generate a signed action request.

The computing device may send 612 the signed action request to the BIOS. In some examples, the kernel driver may send the signed action request to the calling application, which forwards the signed action request to the BIOS. In other examples, the kernel driver may send the signed action request to the BIOS directly.

The computing device (e.g., the BIOS) may perform 614 a signature check to verify the signed action request. For example, the BIOS may send the signed action request to the controller to verify the data integrity and authenticity of the signed action request using the key. In other examples, the BIOS may verify the signature of the signed action request. The computing device (e.g., the BIOS) may perform 616 the BIOS action in response to determining that the signature check passes.

As used herein, the term "and/or" may mean an item or items. For example, the phrase "A, B, and/or C" may mean any of: A (without B and C), B (without A and C), C (without A and B), A and B (but not C), B and C (but not A), A and C (but not B), or all of A, B, and C.

While various examples are described herein, the disclosure is not limited to the examples. Variations of the examples described herein may be within the scope of the disclosure. For example, operations, functions, aspects, or elements of the examples described herein may be omitted or combined.

The invention claimed is:

1. A computing device comprising:
a basic input/output system (BIOS) comprising a BIOS setting, wherein the BIOS setting is to be changed by a BIOS action;
a controller to generate a key upon boot of the computing device; and
a hardware processor in communication with the BIOS and the controller, wherein the hardware processor is to implement a kernel driver, wherein the kernel driver is to:
receive the key from a basic input/output system (BIOS) during operating system (OS) boot;
receive an action request for a BIOS action from an application, wherein the action request comprises a request to perform the BIOS action to change the BIOS setting;
verify, in response to receiving the action request, that the application is an authorized application that is authorized to request the BIOS action;
sign the action request with the key in response to verifying that the application is authorized to request the BIOS action; and
send the signed action request to the BIOS, wherein the BIOS is to perform the BIOS action in response to receiving the signed action request without requiring an administrative password for authorization to perform the BIOS action.

2. The computing device of claim 1, wherein the controller is to store the key and verify the signed action request.

3. The computing device of claim 1, wherein the controller is to send the key to the BIOS upon execution of the BIOS.

4. The computing device of claim 1, wherein the BIOS is to share the key with the kernel driver during OS boot using a secure key exchange protocol.

5. The computing device of claim 1, wherein the BIOS is to erase memory storing the key to prevent additional reads to the key in response to sending the key to the kernel driver.

6. The computing device of claim 1, wherein the BIOS is to:
   receive a request for the key from the kernel driver;
   request the key from the controller in response to the request for the key from the kernel driver; and
   pass the key to the kernel driver in response to receiving the key from the controller.

7. The computing device of claim 1, wherein the kernel driver is to return the signed action request to the application, and wherein the application sends the signed action request to the BIOS.

8. The computing device of claim 1, wherein the kernel driver is to send the signed action request to the BIOS to perform the BIOS action.

9. A computing device comprising:
   a basic input/output system (BIOS) comprising a BIOS setting, wherein the BIOS setting is to be changed by a BIOS action, and wherein the BIOS is to generate a key upon boot of the computing device;
   a hardware processor in communication with the BIOS, wherein the hardware processor is to implement a kernel driver, wherein the kernel driver is to:
   receive the key from the BIOS during operating system (OS) boot;
   receive an action request for a BIOS action from an application, wherein the action request comprises a request to perform the BIOS action to change the BIOS setting;
   verify, in response to receiving the action request, that the application is an authorized application that is authorized to request the BIOS action;
   sign the action request with the key in response to verifying that the application is authorized to request the BIOS action; and
   send the signed action request to the BIOS, wherein the BIOS is to perform the BIOS action in response to receiving the signed action request without requiring an administrative password for authorization to perform the BIOS action.

10. The computing device of claim 9, wherein the BIOS is to create an interface to allow the kernel driver to request the key.

11. The computing device of claim 9, wherein the BIOS is to:
    detect the signed action request; and
    perform a signature check to verify the signed action request.

12. The computing device of claim 11, wherein the BIOS is to perform the BIOS action in response to determining that the signature check passes.

13. A non-transitory tangible computer-readable medium comprising instructions that, when executed, cause a hardware processor of a computing device to:
    send a request from a kernel driver during operating system (OS) boot to a basic input/output system (BIOS) for a key, wherein the key is generated by a controller or the BIOS upon boot of the computing device;
    receive an action request for a BIOS action from an application, wherein the action request comprises a request to perform the BIOS action to change a BIOS setting;
    verify, in response to receiving the action request, that the application is an authorized application that is authorized to request the BIOS action; and
    sign the action request with the key in response to verifying that the application is authorized to request the BIOS action; and
    send the signed action request to the BIOS, wherein the BIOS is to perform the BIOS action in response to receiving the signed action request without requiring an administrative password for authorization to perform the BIOS action.

14. The non-transitory tangible computer-readable medium of claim 13, wherein the instructions when executed further cause the hardware processor to expose an interface for receiving the action request for the BIOS action from the application.

15. The computing device of claim 1, wherein verifying that the application is the authorized application comprises:
    comparing the application to a plurality of authorized applications on a whitelist.

16. The computing device of claim 9, wherein verifying that the application is the authorized application comprises:
    verifying an on-disk identity of the application; and
    checking if a process used by the application to send the action request is an authorized process.

17. The non-transitory tangible computer-readable medium of claim 13, wherein verifying that the application is an authorized application comprises:
    determining if a location of the application is controlled via a strong-control list (ACL).

* * * * *